United States Patent
Mulzer et al.

(10) Patent No.: US 11,084,914 B2
(45) Date of Patent: Aug. 10, 2021

(54) HARDCOAT

(71) Applicant: Rohm and Haas Electronic Materials LLC, Marlborough, MA (US)

(72) Inventors: Michael Mulzer, Marlborough, MA (US); Jieqian Zhang, Southborough, MA (US); Joseph Kao, Foster City, CA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 55 days.

(21) Appl. No.: 16/208,693

(22) Filed: Dec. 4, 2018

(65) Prior Publication Data

US 2019/0185633 A1    Jun. 20, 2019

Related U.S. Application Data

(60) Provisional application No. 62/608,314, filed on Dec. 20, 2017.

(51) Int. Cl.

| | |
|---|---|
| *B05D 1/00* | (2006.01) |
| *C08J 7/046* | (2020.01) |
| *C09D 7/20* | (2018.01) |
| *C09D 7/47* | (2018.01) |
| *C09D 7/63* | (2018.01) |
| *C09D 7/40* | (2018.01) |
| *C09D 4/00* | (2006.01) |
| *C09D 143/04* | (2006.01) |
| *C08J 7/16* | (2006.01) |
| *C08L 33/12* | (2006.01) |
| *C08L 75/16* | (2006.01) |
| *C08L 83/04* | (2006.01) |
| *C08K 5/1515* | (2006.01) |

(52) U.S. Cl.
CPC ............. *C08J 7/046* (2020.01); *C08J 7/16* (2013.01); *C09D 4/00* (2013.01); *C09D 7/20* (2018.01); *C09D 7/47* (2018.01); *C09D 7/63* (2018.01); *C09D 7/67* (2018.01); *C09D 143/04* (2013.01); *B05D 2201/02* (2013.01); *B05D 2502/00* (2013.01); *B05D 2503/00* (2013.01); *B05D 2505/50* (2013.01); *C08J 2379/08* (2013.01); *C08K 5/1515* (2013.01); *C08L 33/12* (2013.01); *C08L 75/16* (2013.01); *C08L 83/04* (2013.01)

(58) Field of Classification Search
CPC ............ B05D 2502/00; B05D 2503/00; B05D 2505/50; B05D 2201/02
See application file for complete search history.

(56) References Cited

U.S. PATENT DOCUMENTS

| | | | |
|---|---|---|---|
| 2015/0159044 A1* | 6/2015 | Bae | C08G 59/3281 523/435 |
| 2017/0369654 A1 | 12/2017 | Kao et al. | |
| 2018/0196169 A1* | 7/2018 | Choi | G02B 1/16 |

FOREIGN PATENT DOCUMENTS

| | | | |
|---|---|---|---|
| WO | 2014088189 A1 | 6/2014 | |
| WO | WO-2016208785 A1 * | 12/2016 | ............. C08L 79/08 |

OTHER PUBLICATIONS

Search report for corresponding Taiwan Application No. 107144722 dated Jan. 8, 2020.

* cited by examiner

*Primary Examiner* — Hai Y Zhang
(74) *Attorney, Agent, or Firm* — Shaorong Chen

(57) ABSTRACT

Display substrates having a hard coat layer on a colorless polyimide substrate are formed from hard coat compositions having certain organic solvents that do not substantially impact the optical and mechanical properties of the colorless polyimide substrate.

3 Claims, No Drawings

HARDCOAT

The present invention relates to liquid curable hard coating formulations which can be applied to plastic substrates for optical uses.

The display industry has an interest in flexible devices which can be bent, folded or rolled like paper. Such flexible display devices are envisioned to use a plastic substrate instead of the glass substrate used in conventional displays as plastic substrates are more flexible than glass ones, and are less susceptible to breakage. Plastic suitable for use as a display substrate must also possess sufficient optical clarity. One suitable plastic is polyimide.

While plastics possess many of the characteristics needed for a flexible substrate, they do not have a sufficiently high surface hardness demanded by display applications. Hard coating compositions are used to deposit a hard coat on the surface of the plastic substrate to increase the surface hardness. Such hard coating compositions contain an organic solvent and are typically deposited using liquid coating techniques. Suitable hard coating compositions may comprise a curable siloxane polymer in an organic solvent, such as those disclosed in U.S. Published Patent Application No. 2015/0159044A1. Upon curing, such hard coat compositions disclosed in the U.S. 2015/0159044A1 application are purported to increase the surface hardness as compared to the plastic substrate without such coating. While such hard coating compositions are suitable for many plastic substrates, the organic solvents used in such hard coating compositions adversely impact the optical clarity and mechanical properties of an optically clear flexible substrate, such as a colorless polyimide substrate. During the coating process the solvent contacts the substrate and can significantly alter the properties of the substrate, such as causing a reduction in mechanical properties of the substrate such as indentation modulus and hardness, diminished optical transparency, overall reduced pencil hardness for the resulting hard coat-substrate stack, and reduce mechanical bending endurance. There is a need in the industry for hard coating compositions that provide increased hardness without adversely affecting the optical clarity and/or the mechanical properties of a flexible substrate.

The present invention provides a method comprising: (a) providing a flexible substrate; and (b) disposing a layer of a coating composition on the flexible substrate; wherein the flexible substrate has a pencil hardness of ≥1H, a haze value of <2%, and a yellowness index of <6; and wherein the coating composition comprises: (1) one or more curable oligomers; and (2) at least one organic coating solvent chosen from: 2,6-dimethylcyclohexanone; 2,4-dimethyl-3-pentanone; 2,4-dimethyl-3-pentanol; 2,2,4,4-tetramethyl-3-pentanone; 2,6-dimethyl-4-heptanone; methyl 2-hydroxy-2-methylpropanoate; isopropyl acetate; and isoamyl acetate.

Also provided by the present invention is a composition comprising: (1) one or more curable siloxane oligomers; and (2) at least one organic coating solvent chosen from: 2,6-dimethylcyclohexanone; 2,4-dimethyl-3-pentanone; 2,4-dimethyl-3-pentanol; 2,2,4,4-tetramethyl-3-pentanone; 2,6-dimethyl-4-heptanone; and methyl 2-hydroxy-2-methylpropanoate.

As used throughout this specification, the following abbreviations shall have the following meanings, unless the context clearly indicates otherwise: ° C.=degree Celsius; g=gram; mg=milligram; L=liter; mL=milliliter; GPa=gigapascal; cm=centimeter; nm=nanometer; mN=milliNewton; kgf=kilogram-force; fpm=feet per minute; ca.=approximately; mW=milliWatt; and Da=dalton.

Unless otherwise specified, all amounts are percent by weight ("wt %") and all ratios are molar ratios. All numerical ranges are inclusive and combinable in any order, except where it is clear that such numerical ranges are constrained to add up to 100%. The articles "a", "an" and "the" refer to the singular and the plural. "Alkyl" refers to linear, branched and cyclic alkyl unless otherwise specified. "Alkyl" refers to an alkane radical, and includes alkane monoradicals, diradicals (alkylene), and higher-radicals. "Halo" refers to fluoro, chloro, bromo, and iodo. When an element is referred to as being "on" another element, it can be directly on the other element or intervening elements may be present therebetween. In contrast, when an element is referred to as being "directly on" another element, there are no intervening elements present. The term "oligomer" refers to dimers, trimers, tetramers and other relatively low molecular weight polymeric materials that are capable of further curing. As used herein, the term "oligomer" refers to a molecule having from 2 to 200 polymerized monomer units, preferably at least 5, preferably at least 7, preferably no more than 175, preferably no more than 150. By the term "curing" is meant any process, such as polymerization or condensation, that increases the overall molecular weight of the present oligomers. "Curable" refers to any material capable of being cured under certain conditions. When the state of a material described herein is referred to as "liquid", "solid", or "gaseous", such reference is made to the state of the material at room temperature and atmospheric pressure, unless otherwise specified.

Average particle diameter is an arithmetic mean determined by Scanning Electron Microscopy and a Zetasizer Nano Z system. Surface area is determined using a BET surface area analyzer and reported as the arithmetic average. Molecular weight distribution and polystyrene equivalent molecular weight were measured with Viscotek TDA 305 SEC system with OmiSEC 4.6 software. Agilent PLgel Mixed E column (2 in series, 5 µm particle size, 30 cm L×7.6 mm ID column) and tetrahydrofuran (THF) were used for separation and sample preparation (0.25 wt. %). Column temperature was set to 40° C. during analysis and flow rate at 0.7 mL/min. For calibration, Agilent EasiCal PS2 kit was used. A coating is optically transparent if it exhibits an average light transmittance of at least 80%, and preferably at least 85% over the wavelength range of 380-700 nm.

The inventors have found that hard coating compositions containing certain solvents have significantly less adverse impact on the optical and mechanical properties of flexible substrates, and in particular polyimide, as compared to solvents conventionally used with coating compositions for use on plastic substrates. Accordingly, the present invention provides a method comprising: (a) providing a flexible substrate; and (b) disposing a layer of a coating composition on the flexible substrate; wherein the flexible substrate has a hardness of ≥1H, a haze value of <2%, and a yellowness index of <4; and wherein the coating composition comprises: (1) one or more curable oligomers; and (2) at least one organic coating solvent chosen from: 2,6-dimethylcyclohexanone; 2,4-dimethyl-3-pentanone; 2,4-dimethyl-3-pentanol; 2,2,4,4-tetramethylpentan-3-one; 2,6-dimethylheptan-4-one; methyl 2-hydroxy-2-methylpropanoate; isopropyl acetate; and isoamyl acetate.

As used herein, the term "flexible substrate" refers to a substrate capable of being bent or molded around a radius of ≤2 mm numerous times without breaking, permanent deformation, crease formation, fracture, crack formation, or the like. One suitable test for flexible substrates is whether the substrate can endure ≥50,000 bending cycles around a 1 mm radius. Exemplary flexible substrates include, but are not limited to, polyimide substrates, polyethylene-terephthalate substrates, polyethylene naphthalate substrates, polycarbonate substrates, polysulfide substrates, polyethylene substrates, polypropylene substrates, and combinations thereof it is preferred that the flexible substrate is a polyimide, and more preferably a colorless polyimide. As used herein, the term "colorless polyimide" refers to a polyimide having a pencil hardness of ≥1H (0.75 kgf) and preferably ≥2H, a haze value of <2% and preferably <1%, and a yellowness index of <6 and preferably <4, each as determined according to the techniques described herein. Preferably, the yellowness index is <4, more preferably <3, and even more preferably <2. Preferably, the flexible substrate used in the invention has a % transmittance of ≥90. Polyimide polymers, such as colorless polyimide polymers, are well-known in the art, and are available from a variety of sources, such as E.I. DuPont de Nemours (Wilmington, Del.) and Kolon Industries, Inc. (Korea), among others. Preferred are polyimide substrates, particularly colorless polyimide substrates, useful in flexible display applications, that is, substrates capable of being folded, bent, rolled, or otherwise manipulated to form a flexible display device. Such flexible substrates may have any suitable thickness, depending on the intended use. For example, such substrates may have a thickness ranging from 25 to 250 μm, and preferably from 25 to 100 μm.

Any suitable hard coat composition may be used in the present method, provided that it comprises at least one curable oligomer and at least one organic coating solvent chosen from 2,6-dimethylcyclohexanone; 2,4-dimethyl-3-pentanone; 2,4-dimethyl-3-pentanol; 2,2,4,4-tetramethyl-3-pentanone; 2,6-dimethyl-4-heptanone; methyl 2-hydroxy-2-methylpropanoate; isopropyl acetate; and isoamyl acetate. Suitable curable oligomers are any which form a hard coat layer upon curing. As used herein, the term "hard coat" refers to a material, coating, or layer on a substrate that forms a film upon curing having a higher pencil hardness than the substrate. Such hard coat layers protect the underlying substrate from mechanical abrasion and wear, and optionally enhances the self-cleaning properties of the surface.

Suitable curable oligomers useful in the present hard coat compositions include, but are not limited to, (meth)acrylate compositions, urethane oligomers, (meth)acrylate-urethane oligomers, siloxane oligomers, and combinations thereof. Liquid curable oligomers are preferred. Suitable (meth)acrylate oligomers include, without limitation, oligomers comprising as polymerized units one or more (meth)acrylate monomers chosen from an aliphatic monofunctional (meth)acrylate monomers and aliphatic multifunctional (meth)acrylate monomers. Exemplary (meth)acrylate-urethane oligomers and those comprising as polymerized units one or more aliphatic urethane (meth)acrylate monomers. Suitable acrylate oligomers and urethane oligomers are those having a formula molecular weight of from 1,000 to 20,000 Da, preferably, from 1,500 to 10,000 Da. It is preferred that the present curable oligomer is chosen from (meth)acrylate oligomers, (meth)acrylate-urethane oligomers, siloxane oligomers, and combinations thereof, more preferably from (meth)acrylate-urethane oligomers and a siloxane oligomer, even more preferably the curable oligomer is a siloxane oligomer, and yet more preferably a liquid siloxane oligomer.

Suitable siloxane oligomers are those disclosed in U.S. Published Patent Application 2015/0159044, and in U.S. Pat. Nos. 7,790,347 and 6,391,999, and in copending U.S. patent application Ser. No. 15/602,196. In one embodiment, preferred curable oligomers comprise polymerized units of formula $R^1{}_m R^2{}_n Si(OR^3)_{4-m-n}$, wherein: $R^1$ is a $C_{5-20}$ aliphatic group comprising an oxirane ring fused to an alicyclic ring; $R^2$ is a $C_{1-20}$ alkyl, $C_{6-30}$ aryl group, or a $C_{5-20}$ aliphatic group having one or more heteroatoms; $R^3$ is a $C_{1-4}$ alkyl group or $C_{1-4}$ acyl group; m is 0.1 to 2.0; and n is 0 to 2.0. When the siloxane oligomer contains siloxane units which are not identical, m and n are molar average values. It is preferred that $R^1$ contains at least 6 carbon atoms, preferably no more than 15, preferably no more than 12, preferably no more than 10. Preferably, $R^1$ comprises an oxirane ring fused to an alicyclic ring having 5 or 6 carbon atoms, preferably six carbon atoms, and more preferably a cyclohexane ring. Preferably, $R^1$ contains no elements other than carbon, hydrogen and oxygen. It is preferred that R' is an epoxycyclohexyl (that is, a cyclohexene oxide) group linked to silicon by a —$(CH_2)_j$— group, where j is from 1 to 6, and preferably 1 to 4. Preferably, when $R^2$ is alkyl it contains no more than 15 carbon atoms, more preferably no more than 12, and yet preferably no more than 10. When $R^2$ is an aryl group it preferably contains no more than 25 carbon atoms, more preferably no more than 20, and yet preferably no more than 16. The term "$C_{5-20}$ aliphatic group having one or more heteroatoms" refers to a $C_{5-20}$ aliphatic group having one or more of: a halogen such as fluorine; an ester group such as an acrylate group, a methacrylate group, a fumarate group, or a maleate group; a urethane group; and a vinyl ether group. It is preferred that $R^2$ is a $C_{1-20}$ alkyl or $C_{6-30}$ aryl group, and more preferably $C_{1-20}$ alkyl. In an alternate preferred embodiment, $R^2$ is a $C_{1-20}$ alkyl or a $C_{5-20}$ aliphatic group having one or more heteroatoms, and more preferably $C_{1-20}$ alkyl. Preferably, when $R^3$ is alkyl, it is methyl or ethyl, and more preferably methyl. When $R^3$ is acyl, it is preferably formyl or acetyl. Preferably, m is at least 0.2, and more preferably at least 0.5; preferably no greater than 1.75, and more preferably no greater than 1.5. Preferably, n is no greater than 1.5, more preferably no greater than 1.0, yet preferably no greater than 0.8, and even more preferably n is zero. Suitable curable siloxane oligomers are available from Polyset Company (Mechanicville, N.Y.).

The present hard coat compositions comprise an organic coating solvent chosen from: 2,6-dimethylcyclohexanone; 2,4-dimethyl-3-pentanone; 2,4-dimethyl-3-pentanol; 2,2,4,4-tetramethyl-3-pentanone; 2,6-dimethyl-4-heptanone; methyl 2-hydroxy-2-methylpropanoate;isopropyl acetate; isoamyl acetate; and mixtures thereof, preferably comprise an organic coating solvent chosen from: 2,6-dimethylcyclohexanone; 2,4-dimethyl-3-pentanone; 2,4-dimethyl-3-pentanol; 2,2,4,4-tetramethyl-3-pentanone; 2,6-dimethyl-4-heptanone; methyl 2-hydroxy-2-methylpropanoate; isoamyl acetate; and mixtures thereof, and more preferably comprise an organic coating solvent chosen from: 2,6-dimethylcyclohexanone; 2,4-dimethyl-3-pentanone; 2,4-dimethyl-3-pentanol; 2,2,4,4-tetramethyl-3-pentanone; 2,6-dimethyl-4-heptanone; and methyl 2-hydroxy-2-methylpropanoate; and mixtures thereof.

Optionally, the present hard coat compositions may comprise one or more secondary organic solvents in addition to the one or more organic coating solvents described above. The one or more secondary organic solvents are different from the one or more organic coating solvents. A wide variety of organic solvents may be used as the secondary organic solvent in the present compositions, provided that the organic coating solvent is in the majority (>50 wt % of the solvent mixture) and the secondary organic solvent is in the minority (<50 wt % of the solvent mixture). Suitable secondary organic solvents have from 3 to 10 carbon atoms, and may be aliphatic or aromatic. Preferably, the secondary organic solvent is aliphatic and more preferably a $C_{3-10}$ aliphatic compound having one or more oxygen atoms. Exemplary secondary organic solvents include, but are not limited to: 1-methoxypropan-2-ol (PGME); 1-ethoxypropan-2-ol (PGEE); 1-methoxy-2-methylpropan-2-ol; methyl lactate; ethyl lactate; methyl glycolate; 1-methoxy-propan-2-one; hydroxy acetone; 1,2-dimethoxyethane; 1,2-dimethoxypropane; 1-methoxy-2-butanol; methyl 2-methoxyacetate; isopropanol; cyclopentanol; 2-methylbutan-1-ol; 4-methylpentan-2-ol; 3-methylbutan-2-ol; toluene; and mixtures thereof.

Typically, the one or more curable oligomers are present in the hard coat composition in an amount of from 25 to 99 wt %, based on the total weight of the composition excluding organic solvent. Preferably, the hard coat composition comprises a siloxane oligomer in an amount of at least 28 wt %, preferably at least 29 wt %, preferably at least 30 wt %; preferably no more than 99 wt %, and preferably no more than 65 wt %, based on the total weight of the composition excluding organic solvent. When the curable oligomer is a siloxane, it is preferred that the siloxane oligomer comprises from 25 to 80 wt %, more preferably from 30 to 70 wt %, based on the total weight of the composition excluding organic solvent. Preferably, the present hard coat compositions comprise from 50.1 to 100 wt % of the organic coating solvent described above and from 0 to 49.9 wt % of one or more secondary organic solvents, based on the total weight of organic solvent. When one or more secondary organic solvents are used, they are preferably present in an amount of from 1 to 49.5 wt %, preferably from 2 to 40 wt %, and more preferably from 5 to 20 wt %, based on the total weight of organic solvents.

Optionally, reactive modifiers may be added to the hard coat composition to modify the formulation for performance improvement. Such reactive modifiers include, without limitation, flexibility modifiers, hardness modifiers, viscosity modifiers, optical property modifiers, and the like. Preferably, the reactive modifiers are present in the resin composition in a total amount from 0 to 20 wt %; preferably at least 1 wt %, preferably at least 4 wt %, preferably at least 8 wt %; preferably no more than 17 wt %, and preferably no more than 15 wt %, based on the total weight of components in the composition exclusive of organic solvent. Preferably, the reactive modifier comprises at least two epoxycyclohexane groups or at least two oxetane rings, and more preferably two epoxycyclohexane groups. Preferred reactive modifiers are shown below, grouped according to the property usually improved by their use, where n, x, and y refer to the number of repeat units, where n=1 to 100, x=1 to 100, and y=1 to 100.

Flexibility

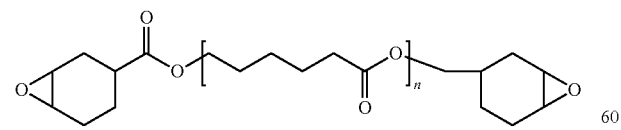

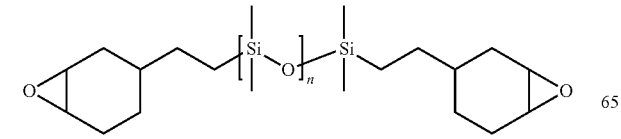

-continued

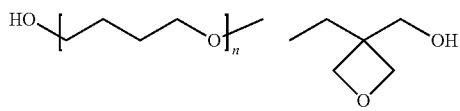

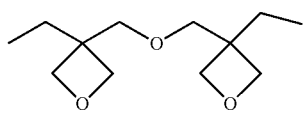

Hardness

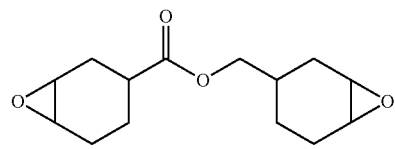 [SMILES: O=C(OCC1CCC2OC2C1)C1CCC2OC2C1]

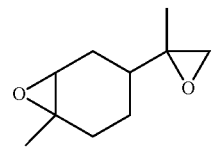

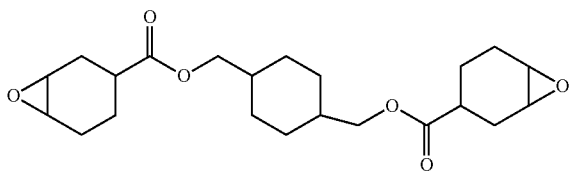 [SMILES: O=C(OCC1CCC(COC(=O)C2CCC3OC3C2)CC1)C1CCC2OC2C1]

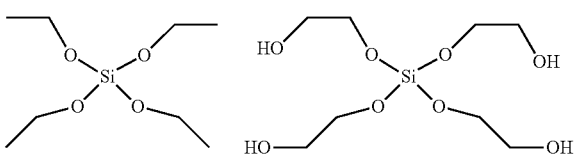

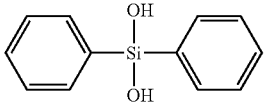 [SMILES: O[Si](O)(c1ccccc1)c1ccccc1]

Viscosity

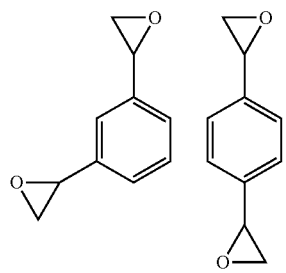

Optical Properties

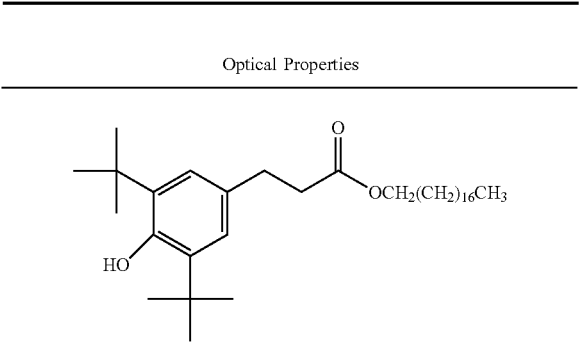

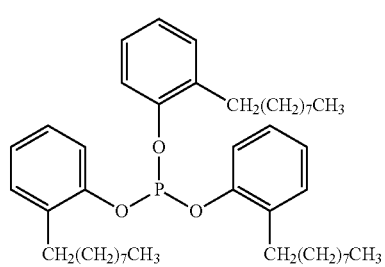

Nanoparticle Surface Ligand

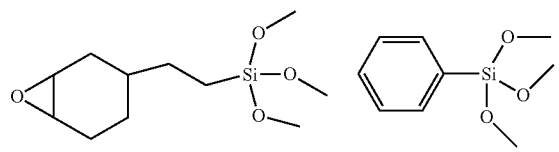

Siloxane

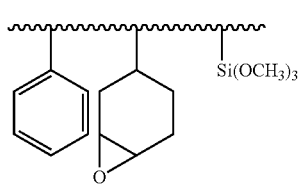

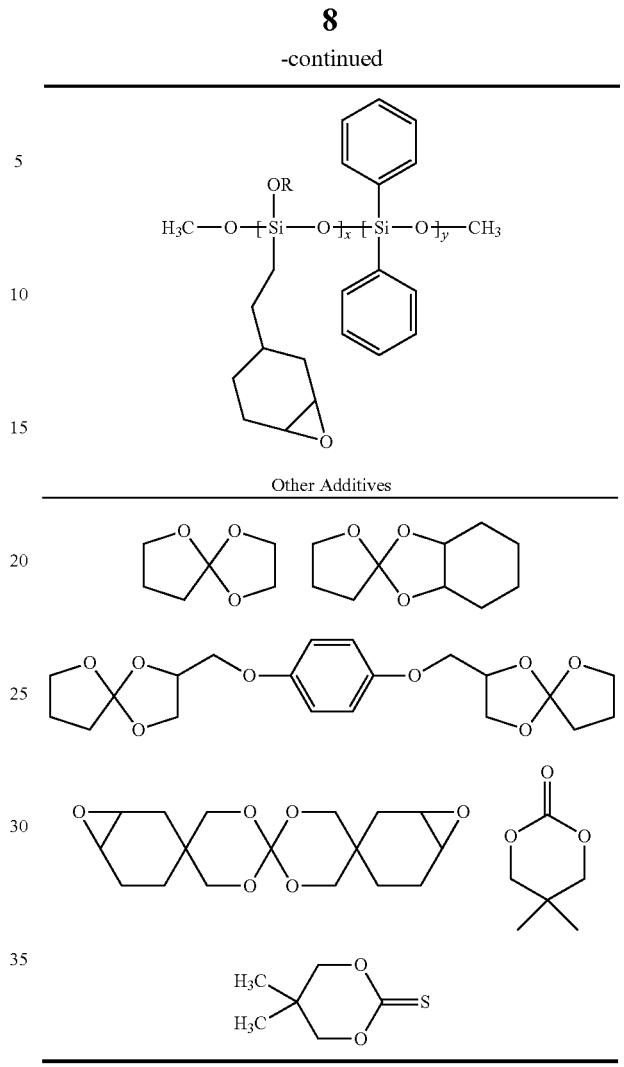

Other Additives

Optionally, one or more commonly known other additives may be added to the hard coat composition to further modify properties of the cured coating. Such optional additives include, without limitation, adhesion promoters, leveling agents, defoaming agents, anti-static agents, anti-blocking agents, UV absorbers, optical whitening agents, anti-fingerprint additives, scratch resistance additives, and the like. Mixtures of two or more of such optional additives may be used in the present hard coat compositions. These additives may be in liquid or solid form. Typically, each additive may be used in an amount of 0 to 5 wt %, and preferably from 0.1 to 5 wt %, and more preferably from 1 to 3 wt %, based on the total weight of the composition. Scratch resistance additives may be used in an amount of from ≤5 wt %, preferably ≤3 wt %, and more preferably ≤1.5 wt %, based on the total weight of the composition. A suitable amount of such scratch resistance additives is from 0 to 5 wt %, preferably from 0.1 to 3 wt %, and more preferably from 0.1 to 1.5 wt %, based on the total weight of the composition. Scratch resistance additives may contain small amount of inorganic particles.

The present hard coat compositions optionally contain a curing agent, such as a photocuring agent, a thermal curing agent, or a combination thereof. Preferably, the hard coat composition comprises a photocuring agent, and more preferably a cationic photoinitiator. Such curing agent is present in the hard coat compositions in an amount of from 0 to 8 wt %, based on the total weight of the composition excluding organic solvent, and preferably from 0.5 to 7 wt %. Preferably, the hard coat composition comprises at least 1 wt % of the cationic photoinitiator, preferably at least 1.5 wt %; preferably no more than 6 wt %, preferably no more than 5 wt %, and preferably no more than 4.5 wt %. Preferred initiators include, e.g., diaryliodonium salts and triarylsulfonium salts. Such curing agents are well-known to those skilled in the art and are generally commercially available from a variety of sources. Optionally, a photosensitizer may be used in combination with a photocuring agent. Any suitable photosensitizer known in the art may be used. The selection of which photosensitizer and the amount thereof to be used is within the ability of those skilled in the art.

Nanoparticles may optionally be, and preferably are, added to the present hard coat compositions. Suitable nanoparticles are inorganic nanoparticles and organic nanoparticles. When inorganic particles are used in the present hard coat compositions, they are used in an amount of from 35 to 66 wt %, based on the total weight of the composition excluding organic solvent. Preferably, the hard coat composition comprises at least 40 wt % non-porous nanoparticles of silica, a metal oxide, or a mixture thereof, preferably at least 42; preferably no more than 65 wt %, preferably no more than 64 wt %, preferably no more than 63 wt %. The organic nanoparticles may be present in the curable composition in an amount ranging from 0 to 10 wt %, preferably in an amount of at least 0.1 wt %, preferably in an amount of up to 6 wt %, based on the total weight of the resin composition excluding any organic solvent. Preferably, the organic nanoparticle is present in the hard coat composition in an amount of from 0.1 to 10 wt %, and more preferably from 0.1 to 6 wt %, based on the total weight of the composition excluding any organic solvent. Suitable inorganic nanoparticles are non-porous nanoparticles chosen from silica, metal oxide, or a mixture thereof. Preferably, the non-porous nanoparticles are silica, zirconium oxide, or a mixture thereof, and preferably silica. Preferably, the surface area of the non-porous nanoparticles is at least 50 $m^2/g$, preferably at least 60 $m^2/g$; preferably no greater than 500 $m^2/g$, preferably no greater than 400 $m^2/g$. In general, the non-porous nanoparticles of silica, a metal oxide, or a mixture thereof, the non-porous nanoparticles having an average particle diameter from 5 to 50 nm. Preferably, the average diameter of the nanoparticles is at least 10 nm, preferably at least 15 nm; preferably no greater than 40 nm, preferably no greater than 35 nm. Preferably, the non-porous nanoparticles are functionalized with substituent groups that can react with the epoxy group of epoxy-siloxane oligomer under a cationic photo curing process or thermal curing condition. Preferred substituent groups include, e.g., epoxy, acrylate, amino, vinyl ether, etc. Suitable organic nanoparticles include, without limitation, core-shell rubber (CSR) nanoparticles. The optional CSR organic nanoparticles comprise a rubber particle core and a shell layer, such CSR particles having an average diameter of from 50 to 250 nm. The shell layer of the CSR nanoparticles provides compatibility with the hard coat composition and has limited swellability to facilitate mixing and dispersion of the CSR nanoparticles in the hard coat composition. Suitable CSR nanoparticles are commercially available, such as those available under the following tradenames: Paraloid EXL 2650 A, EXL 2655, EXL2691 A. available from The Dow Chemical Company, or Kane Ace® MX series from Kaneka Corporation, such as MX 120, MX 125. MX 130, MX 136, MX 551, or METABLEN SX-006 available from Mitsubishi Rayon, or Genioperl P52 from Wacker Chemie AG.

It will be appreciated that a mixture of nanoparticles may be used in the present curable hard coat compositions, such as a mixture or organic nanoparticles, a mixture of non-porous nanoparticles, or a mixture or organic nanoparticles and inorganic (non-porous) nanoparticles. One example of a mixture of nanoparticles is a mixture of two or more different kinds of non-porous nanoparticles such as a mixture of silica and zirconium oxide nanoparticles. Such mixture of nanoparticles may be a mixture of two or more different non-porous nanoparticles having the same or similar average diameter, such as a mixture of 20 nm silica and 20 nm zirconium oxide, or may be a mixture of two or more different non-porous nanoparticles having different average diameters, such as a mixture of 10 nm silica and 50 nm zirconium oxide. Another example of a mixture of nanoparticles is a mixture of two or more of the same non-porous nanoparticles but having different average diameters such as a mixture of first silica nanoparticles having an average diameter of 10 nm and second silica nanoparticles having an average diameter of 50 nm. When a mixture of silica and metal oxide nanoparticles are used in the present hard coat compositions, the total amount of the nanoparticles is from 35 to 66 wt %. Preferably, the resin composition further comprises one or more CSR nanoparticles, and more preferably a mixture of silica with one or more CSR organic nanoparticles or a mixture of zirconium oxide with one or more CSR organic nanoparticles.

A preferred hard coat composition of the invention comprises (1) one or more curable siloxane oligomers; and (2) at least one organic coating solvent chosen from: 2,6-dimethylcyclohexanone; 2,4-dimethyl-3-pentanone; 2,2,4,4-tetramethylpentan-3-one; and 2,6-dimethylheptan-4-one. More preferably, the hard coat composition further comprises one or more secondary organic solvents different from the organic coating solvent. Even more preferably, the curable siloxane oligomer comprises polymerized units of formula $R^1_m R^2_n Si(OR^3)_{4-m-n}$, wherein: $R^1$ is a $C_{5-20}$ aliphatic group comprising an oxirane ring fused to an alicyclic ring; $R^2$ is a $C_{1-20}$ alkyl, $C_{6-30}$ aryl group, or a $C_{5-20}$ aliphatic group having one or more heteroatoms; $R^3$ is a $C_{1-4}$ alkyl group or a $C_{1-4}$ acyl group; m is 0.1 to 2.0; and n is 0 to 2.0. Yet more preferably, the hard coat composition further comprises one or more of: nanoparticles; a cationic photoinitiator; a reactive modifier comprising at least two epoxycyclohexane groups or at least two oxetane rings; leveling agents; and mixtures thereof.

In use, the present hard coat compositions are disposed on a surface of a flexible substrate by any suitable means known in the art to form a coating of the hard coat composition on the polyimide substrate. Suitable methods for coating the hard coat composition include, but are not limited to, spin-coating, curtain coating, spray coating, roller coating, doctor blading, bar coating, dip coating, slot die coating, and vapor deposition, among other methods. Next, the coating is baked to remove the organic coating solvent and any optional secondary organic solvent. The selection of such baking conditions is within the ability of those skilled in the art. Next, the coating is cured, such as by heating or by exposure to actinic radiation (photocuring), and preferably by exposure to UV radiation, to form a hard coat film on the surface of the flexible substrate.

An advantage of the present invention is that organic coating solvent used in the hard coat compositions does not substantially alter the optical or mechanical properties of the flexible. By the term "does not substantially alter the optical properties" is meant that solvent used in the hard coat composition does not cause haze to form on the flexible substrate upon contact for 3 minutes at 90° C., as determined by visual inspection. By the term "does not substantially alter the mechanical properties" is meant that solvent used in the hard coat composition does not lower the indentation modulus of the flexible substrate, particularly a polyimide substrate, by more than 5% and the indentation hardness by more than 10% as compared to the flexible before contact with the solvent.

The following general procedures were used in the Examples below.

Pencil Hardness. Pencil hardness measurements of cured coatings were performed using a Qualtech Product Industry Manual Pencil Hardness Tester according to ASTM standard D3363 at 0.75 kgf vertical load using Mitsubishi UNI pencils. For evaluation purposes, the coatings were placed on a level, clean, 0.5 cm thick glass plate.

Indentation Modulus and Hardness. An iMicro™ nanoindenter (manufactured by Nanomechanics, Inc., Oak Ridge, Tenn.) was used to characterize the indentation modulus and hardness of cured hard coatings. The nanoindenter had load and displacement resolutions of 6 nN and 0.04 nm, respectively. It was operated in continuous stiffness mode in which the indenter tip was continuously oscillated at 2 nm amplitude for better surface detection and extracting mechanical properties as a function of indentation depth from a single measurement. A standard Berkovich tip was used whose projected contact area function was calibrated between 200 and 2000 nm indentation depth by making 20-25 indentations on a fused silica specimen with an indentation modulus of 72 GPa ±1 GPa. Samples were mounted on sample holders using a hot melt adhesive with a melting point of approximately 54° C. (Crystal Bond™ 555). Indentations to 2000 nm depth were made on each sample in at least 10 different locations once the test system had reached a thermal drift of <0.1 nm/sec. A Poisson's ratio of 0.3 was assumed. Subsequent to the measurement, 3 to 5 indentations were again made on the fused silica specimen to verify the previous calibration.

Hard Coat Formulations. Formulations were prepared by first combining the desired amount of resin with the desired amount of nanoparticle suspension in a 20 mL scintillation vial, followed by sonication (Fisher Scientific bath sonicator) and vortex mixing at room temperature until a homogenous mixture was obtained. When a nanoparticle suspension was used, it was used as received or the suspension was concentrated under vacuum at room temperature until ca. 95% of the solvent had been removed as judged by loss in sample weight. New solvent was then added as specified, and the mixture homogenized under sonication and vortex mixing. Lastly, the desired amount of photoacid generator (PAG) was added into the solution. The final formulation was left on a rotary mixer for at least 12 hours at room temperature to ensure homogenous mixing before film casting.

Preparation of Hard Coat Films. Draw-down bars (manually or machine-operated) with different gap sizes were used to control film thickness of the hard coating when casting the prepared formulations on transparent polyimide (PI) substrates. The cast films were immediately heated to 90° C. on a hot-plate for three minutes in a fume hood, followed by UV-curing (Fusion D-type bulb, four passes at a belt speed of 47 fpm). The average values for UV irradiance were around 3670, 960, 280, 4360 mW/cm$^2$ in the UVA, UVB, UVC, and UVV regimes, respectively. The average values for energy density were ca. 480, 120, 40, and 570 mJ/cm$^2$ in the UVA, UVB, UVC, and UVV regimes, respectively. Finally, the films were thermally cured for 2 hours at 87° C. in an oven after UV-cure.

Optical Properties. An HP 8453 UV Vis spectrophotometer system was used to measure the yellowness index of the polyimide substrates and the final coating samples. The values were obtained according to ASTM standard E313. A BYK haze measurement system was used to measure the haze of the coating samples. The haze values were obtained according to ASTM standard D1003.

Polyimide Substrates. The commercial polyimide substrates used in the following Examples are described in the following table, where PI 1 and PI 2 refer to transparent polyimides 1 and 2 of the invention and Comparative PI refers to a comparative transparent polyimide.

|  | PI 1 | PI 2 | Comparative PI |
|---|---|---|---|
| Nanoindentation Modulus (GPa) | 5.55 | 6.93 | 4.6 |
| Nanoindentation Hardness (GPa) | 0.52 | 0.51 | 0.43 |
| Yellowness Index | 1.63 | <6 | 1.87 |
| % Haze | 0.99 | 1.5 | 2.9 |
| Pencil Hardness | 3-4 H | 1-2 H | 1 H |
| % Transmittance | 90 | 90 | 87 |

Example 1. On a level surface, a small, clean specimen of polyimide substrate was placed and subsequently each of the solvents reported in Table 1 was placed onto the substrate via pipette so that most of the surface of the specimen was covered with solvent. After being left undisturbed for three minutes at 90° C. on a hotplate, the solvent was removed from the substrate, and the substrate visually inspected for changes in haziness and curl. If no changes were detected, the compatibility of the solvent was rated "Good". If slight or severe haze was detected, the compatibility of the solvent was rated "Acceptable" or "Poor", respectively. The results are reported in Table 1.

TABLE 1

| Solvent | PI 1 | Comparative PI |
|---|---|---|
| Methyl iso-butyl ketone | Poor | Poor to Acceptable |
| PGME | Poor | Acceptable to Good |
| HBM | Acceptable | Acceptable |
| 2,4-Dimethyl-3-pentanone | Good | Poor |
| Toluene | Good | Good |

Example 2. Samples of PI 1 substrate, each having a thickness of 50 μm, were contacted with each of the solvents listed in Table 2 according to the procedure of Example 1. After the solvent was removed, the substrate was evaluated for changes in nanoindentation modulus and nanoindentation hardness. The results are reported in Table 2.

TABLE 2

| Solvent | Nanoindentation Modulus (GPa) | Nanoindentation Hardness (GPa) |
|---|---|---|
| None | 5.58 | 0.53 |
| 2,6-Dimethylcyclohexanone | 5.71 | 0.50 |
| 2,4-Dimethyl-3-pentanone | 5.56 | 0.51 |
| 2,2,4,4-Tetramethyl-3-pentanone | 5.52 | 0.52 |
| HBM | 5.49 | 0.53 |
| 2,6-Dimethyl-4-heptanone | 5.40 | 0.51 |
| 2,4-Dimethyl-3-pentanol | 5.37 | 0.50 |
| Isopropyl acetate | 5.37 | 0.5 |

TABLE 2-continued

| Solvent | Nanoindentation Modulus (GPa) | Nanoindentation Hardness (GPa) |
|---|---|---|
| Isoamyl acetate | 5.37 | 0.5 |
| Toluene | 5.3 | — |
| 2-Hexanone | 5.26 | 0.50 |
| Isopropanol | 5.21 | — |
| 2-Methylcyclohexanone | 4.68 | 0.30 |
| Methyl iso-butyl ketone | 4.44 | 0.35 |
| PGME | 3.7 | — |
| Cyclohexanone | 3.27 | 0.20 |
| 2,4-Dimethyl-3-pentanone/HBM (9/1, w/w) | 5.30 | — |
| 2,4-Dimethyl-3-pentanone/PGME (9/1, w/w) | 5.25 | — |

As can be seen from the data in Table 2, many common solvents used in hardcoat compositions adversely impact the mechanical properties (nanoindentation modulus and hardness) of PI 1.

Example 3. The procedure of Example 2 was repeated except that samples of PI 2 having a thickness of 30 μm were used in place of PI 1. The nanoindentation data and the solvents used are reported in Table 3. As can be seen from the data in Table 3, many common solvents used in hardcoat compositions adversely impact the mechanical properties (nanoindentation modulus and hardness) of PI 2.

TABLE 3

| Solvent | Nanoindentation Modulus (GPa) | Nanoindentation Hardness (GPa) |
|---|---|---|
| None | 6.93 | 0.505 |
| 2,4-Dimethyl-3-pentanone | 6.93 | 0.485 |
| 2,6-Dimethylcyclohexanone | 6.91 | 0.475 |
| Isopropyl acetate | 6.89 | 0.493 |
| Isoamyl acetate | 6.83 | 0.498 |
| 2,6-Dimethyl-4-heptanone | 6.82 | 0.483 |
| 2,2,4,4-Tetramethyl-3-pentanone | 6.76 | 0.495 |
| Cyclohexanone | 6.7 | 0.462 |
| Methyl iso-butyl ketone | 6.58 | 0.479 |
| 2-Methylcyclohexanone | 6.51 | 0.463 |

Example 4. Four formulations were prepared according to the general procedure using the components listed in Table 4, where 24 DP=2,4-dimethyl-3-pentanone, MIBK=methyl isobutyl ketone, and HBM=methyl 2-hydroxy-2-methylpropanoate. The siloxane resin used in each formulation was a commercially available epoxysiloxane (PC-2000HV, available from Polyset). Each formulation contained 1.2 wt % of a triarylsulfonium hexafluoroantimonate salt (50 wt % in propylene carbonate) as a photoactive curing agent. The nanoparticles used were $SiO_2$ nanoparticles having an average particle size diameter of 25 μm (available from Admatechs) as a suspension in the solvent reported in Table 4. The amount of the Each formulation was then coated on separate 50 μm thick samples of PI 1 according to the general procedure described above. The pencil hardness of each coating was determined after curing and the data reported in Table 4.

TABLE 4

| Formulation | Siloxane resin | Nanoparticles | Solvent | Film Thickness | Pencil Hardness |
|---|---|---|---|---|---|
| 1 | 30.7 wt % | 30.7 wt % | 24DP/toluene (1:1, w/w) 37.4 wt % | 10 μm | 4H |
| 2 | 28.4 wt % | 28.4 wt % | HBM 42 wt % | 7 μm | 4H |
| 3 | 30.7 wt % | 30.7 wt % | 24DP/PGME (1:9, w/w) 37.4 wt % | 8 μm | 4H |
| Comparative | 28.4 wt % | 28.4 wt % | MIBK 42 wt % | 7 μm | 3H |

Example 5. The procedure of Example 4 is repeated to prepare Formulations 2-5 using the components in the amounts shown in Table 5. PC-2003 is an epoxysiloxane oligomer available from Polyset. SR399 is dipentaerythritol pentaacrylate available from Sartomer. KTO46 is a photosensitizer available from Lamberti. The nanoparticles are $SiO_2$ nanoparticles having an average particle size diameter of 25 μm (as a suspension in methyl ethyl ketone (MEK), available from Admatechs). The abbreviation 26D refers to 2,6-dimethylcyclohexanone.

TABLE 5

| Formulation | Resin #1 | Resin #2 | PAG | Nanoparticles | Solvent |
|---|---|---|---|---|---|
| 4 | SR399: 3.791 g | DM588: 3.785 g | KTO46: 0.311 g | 50 wt % in 24DP: 15.122 g | — |
| 5 | Acrylate-containing silsesquioxane: 70 wt % | — | PAG: 1 wt %/ KTO46: 4 wt % | — | 24DP: 25 wt % |
| 6 | Polyacrylate-silsesquioxane copolymer: 73 wt % | — | PAG: 2 wt %, | — | 24DP: 25 wt % |
| 7 | PC-2003: 4.91 g | | PAG: 1 wt % | 50 wt % in 24DP: 10.5 g | 26D: 2.7 g |

What is claimed is:

1. A method comprising: (a) providing a flexible substrate; and
    (b) disposing a layer of a coating composition on the flexible substrate wherein the flexible substrate is a colorless polyimide substrate and has a pencil hardness of >1H, a haze value of <2%, and a yellowness index of <6 before the disposition; and wherein the coating composition comprises: (1) siloxane oligomers; and (2)

at least one organic coating solvent chosen from: 2,6-dimethylcyclohexanone; 2,4-dimethyl-3-pentanone; 2,2,4,4-tetramethyl-3-pentanone; 2,4-dimethyl-3-pentanol; 2,6-dimethyl-4-heptanone; and methyl 2-hydroxy-2-methylpropanoate isopropyl acetate; and iso-amyl acetate.

2. The method of claim 1 wherein the coating composition further comprises one or more secondary organic solvents different from the organic coating solvent in an amount of from 1 to 49.5 wt % based on the total weight of organic solvents.

3. The method of claim 1 wherein the coating composition further comprises one or more of: nanoparticles; a cationic photoinitiator; a reactive modifier comprising at least two epoxycyclohexane groups or at least two oxetane rings; leveling agents; and mixtures thereof.

\* \* \* \* \*